United States Patent
Zhou et al.

(10) Patent No.: US 11,960,161 B2
(45) Date of Patent: Apr. 16, 2024

(54) DISPLAY PANEL AND DISPLAY DEVICE

(71) Applicants: Beijing BOE Optoelectronics Technology Co., Ltd., Beijing (CN); BOE Technology Group Co., Ltd., Beijing (CN)

(72) Inventors: Jinzhao Zhou, Beijing (CN); Tingting Zhao, Beijing (CN); Litao Fan, Beijing (CN); Jian Zhang, Beijing (CN); Shubai Zhang, Beijing (CN); Zhiqiang Zhang, Beijing (CN); Qin Xin, Beijing (CN)

(73) Assignees: Beijing BOE Optoelectronics Technology Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 228 days.

(21) Appl. No.: 17/598,843

(22) PCT Filed: Jan. 25, 2021

(86) PCT No.: PCT/CN2021/073635
§ 371 (c)(1),
(2) Date: Sep. 27, 2021

(87) PCT Pub. No.: WO2021/212946
PCT Pub. Date: Oct. 28, 2021

(65) Prior Publication Data
US 2023/0176412 A1     Jun. 8, 2023

(30) Foreign Application Priority Data

Apr. 21, 2020    (CN) .......................... 202010316268.1

(51) Int. Cl.
*G02F 1/1333*     (2006.01)
*G02B 5/20*     (2006.01)
(Continued)

(52) U.S. Cl.
CPC ......... *G02F 1/13338* (2013.01); *G02B 5/208* (2013.01); *G02B 5/26* (2013.01);
(Continued)

(58) Field of Classification Search
CPC .................................................. G02F 1/1333
See application file for complete search history.

(56) References Cited

U.S. PATENT DOCUMENTS

2020/0057340 A1*   2/2020   Jiang ................... G02F 1/13338
2020/0226341 A1    7/2020   He et al.
(Continued)

FOREIGN PATENT DOCUMENTS

| CN | 109061925 | * 12/2018 | ........... G02F 1/1333 |
|---|---|---|---|
| CN | 109061925 A | 12/2018 | |

(Continued)

OTHER PUBLICATIONS

CN202010316268.1 first office action.
CN 202010316268.1 second office action.

*Primary Examiner* — Sang V Nguyen
(74) *Attorney, Agent, or Firm* — IPro, PLLC

(57) ABSTRACT

Provided is a display panel. The display panel includes a display substrate, a diffusion sheet, a transflective film, and a fingerprint identification circuit, wherein the diffusion sheet is provided with at least one through hole, and an orthographic projection of the at least one through hole onto the display substrate is within the orthographic projection of the fingerprint identification circuit onto the display substrate.

16 Claims, 4 Drawing Sheets

(51) Int. Cl.
  *G02B 5/26* (2006.01)
  *G02F 1/1335* (2006.01)
  *G06V 40/12* (2022.01)
  *G06V 40/13* (2022.01)
  *F21V 8/00* (2006.01)

(52) U.S. Cl.
  CPC .... *G02F 1/133504* (2013.01); *G06V 40/1318* (2022.01); *G06V 40/1324* (2022.01); *G06V 40/1365* (2022.01); *G02B 6/004* (2013.01); *G02B 6/0058* (2013.01); *G02F 2203/11* (2013.01)

(56) References Cited

U.S. PATENT DOCUMENTS

| | | | | |
|---|---|---|---|---|
| 2020/0242316 | A1* | 7/2020 | Liu | ............ H10N 30/85 |
| 2021/0033920 | A1* | 2/2021 | Kang | ............ G02F 1/133528 |
| 2021/0133421 | A1* | 5/2021 | Zeng | ............ G06V 40/1324 |
| 2022/0328531 | A1* | 10/2022 | Ozeki | ............ H01L 29/4908 |

FOREIGN PATENT DOCUMENTS

| | | | | |
|---|---|---|---|---|
| CN | 109313703 | A | 2/2019 | |
| CN | 109799643 | * | 5/2019 | ......... G02F 1/13357 |
| CN | 109858398 | A | 6/2019 | |
| CN | 209072544 | * | 7/2019 | ............... G06K 9/00 |
| CN | 110174794 | A | 8/2019 | |
| CN | 110376780 | A | 10/2019 | |
| CN | 110501833 | * | 11/2019 | ............ G02F 1/1333 |
| CN | 110501833 | A | 11/2019 | |
| CN | 209625238 | * | 11/2019 | ............ G02F 1/1333 |
| CN | 209803492 | U | 12/2019 | |
| CN | 110678874 | * | 1/2020 | ............ G06V 10/141 |
| CN | 210295114 | U | 4/2020 | |
| CN | 111507280 | A | 8/2020 | |
| CN | WO-2020181443 | * | 9/2020 | ............... G02F 1/00 |

* cited by examiner

DISPLAY PANEL AND DISPLAY DEVICE

CROSS-REFERENCE TO RELATED APPLICATION

This application is a US national phase application based on PCT/CN2021/073635, filed on Jan. 25, 2021, which claims the priority to the Chinese Patent Application No. 202010316268.1, filed on Apr. 21, 2020 and entitled "DISPLAY PANEL AND DISPLAY DEVICE," the entire content of which is incorporated herein by reference.

TECHNICAL FIELD

The present disclosure relates to the field of display technologies, in particular to a display panel and a display device.

BACKGROUND

A liquid crystal display device may have a fingerprint identification function to recognize a user's identity.

SUMMARY

The present disclosure provides a display panel and a display device. The technical solutions are described below.

In one aspect, a display panel is provided. The display panel includes a display substrate, a diffusion sheet, a transflective film, and a fingerprint identification circuit, wherein the diffusion sheet, the transflective film, and the fingerprint identification circuit are disposed on a side of the display substrate and are sequentially stacked;
  wherein the display substrate has a display area, an orthographic projection of the fingerprint identification circuit onto the display substrate is within the display area, and the fingerprint identification circuit is configured to emit light of a target wavelength, and to perform fingerprint identification according to received light of the target wavelength reflected by an obstacle;
  the transflective film is configured to transmit the light of the target wavelength and reflect light other than the light of the target wavelength; and
  the diffusion sheet is provided with at least one through hole, and an orthographic projection of the at least one through hole onto the display substrate is within the orthographic projection of the fingerprint identification circuit onto the display substrate.

Optionally, the fingerprint identification circuit includes a first light-emitting element and a fingerprint identification sensor, wherein
  the first light-emitting element is configured to emit the light of the target wavelength; and
  the fingerprint identification sensor is configured to perform fingerprint identification according to the received light reflected by the obstacle.

Optionally, the first light-emitting element is an infrared light-emitting diode; and
  the target wavelength is greater than or equal to 850 nm.

Optionally, the fingerprint identification circuit further includes a lens, wherein
  the lens is configured to converge the light of the target wavelength reflected by the obstacle to the fingerprint identification sensor; and
  the fingerprint identification sensor is configured to perform fingerprint identification according to the converged light.

Optionally, the fingerprint identification circuit further includes a supporting plate and a fixing bracket fixedly connected to the supporting plate; and
  the fingerprint identification sensor is fixedly arranged on the supporting plate, and the lens is fixedly arranged on the fixing bracket.

Optionally, a material of the supporting plate includes a soft material, the supporting plate is annular, and a side of the supporting plate proximal to the display substrate is provided with a first opening; and
  the fingerprint identification sensor is disposed in a region enclosed by the supporting plate and fixed on a side of the supporting plate distal from the first opening.

Optionally, the first light-emitting element is disposed outside the region enclosed by the supporting plate and fixed on the side of the supporting plate provided with the first opening.

Optionally, an orthographic projection of the first opening onto the display substrate is overlapped with an orthographic projection of the lens onto the display substrate, and an orthographic projection of the fingerprint recognition sensor onto the display substrate is overlapped with the orthographic projection of the lens onto the display substrate.

Optionally, an aperture of each of the at least one through hole is ranged from 50 μm to 100 μm, and the number of the at least one through hole provided in the diffusion sheet is ranged from 50 to 100.

Optionally, the display substrate is a liquid crystal display substrate.

Optionally, the display substrate includes a first polarizing layer, an array substrate, a liquid crystal layer, a color film substrate, and a second polarizing layer that are sequentially stacked.

Optionally, the display panel further includes a backlight source, wherein
  the backlight source is disposed between the diffusion sheet and the fingerprint identification circuit and configured to provide backlight for the display substrate.

Optionally, a wavelength of light emitted by the backlight source is ranged from 380 nm to 780 nm.

Optionally, the backlight source includes a second light-emitting element and a light guide plate;
  the light guide plate is provided with a plurality of dots, and the number of the dots in a target area of the light guide plate is smaller than the number of the dots on the light guide plate excluding the target area; and
  an orthographic projection of the target area onto the display substrate is overlapped with an orthographic projection of the at least one through hole onto the display substrate.

Optionally, the orthographic projection of the target area onto the display substrate and the orthographic projection of the fingerprint identification circuit onto the display substrate coincide.

Optionally, the display panel further includes a prism assembly, wherein
  the prism assembly is disposed on a side of the diffusion sheet distal from the backlight source.

Optionally, the prism assembly includes a first prism and a second prism, wherein
  the first prism is disposed on a side of the diffusion sheet distal from the fingerprint identification circuit, and the second prism is disposed on a side of the first prism distal from the diffusion sheet.

Optionally, the display panel further includes a fixed frame, wherein
the fixed frame is provided with a second opening in which the fingerprint identification circuit is fixed.

In another aspect, a display device is provided. The display device includes a fingerprint identification driving circuit and the display panel as described in the foregoing aspect, wherein
the fingerprint identification driving circuit is connected to a fingerprint identification circuit in the display panel and configured to provide a driving signal for the fingerprint identification circuit.

Optionally, the display device further includes a gate driving circuit and a source driving circuit, wherein
the gate driving circuit is connected to each row of pixels in the display panel, and configured to provide a gate driving signal for each row of pixels; and
the source driving circuit is connected to each column of pixels in the display panel, and configured to provide a data signal for each column of pixels.

BRIEF DESCRIPTION OF THE DRAWINGS

For clearer description of the technical solutions in the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

In the related art, the liquid crystal display device includes a display substrate and a capacitive fingerprint identification circuit disposed in a fingerprint detection area of the display substrate, and the capacitive fingerprint identification circuit includes a semiconductor capacitor. When a user touches the fingerprint detection area of the display substrate with a finger, the capacitive fingerprint identification circuit may determine positions of detected ridges and valleys according to the ridges and the valleys of fingerprints of the user and capacitance formed by the semiconductor capacitor, so as to complete fingerprint identification.

Currently, a display device is generally an organic light-emitting diode (DUD) display device or a liquid crystal display (LCD) device.

Since a display panel in the OLED display device is self-luminous as a whole, a fingerprint identification circuit in the OLED display panel may be arranged in a display area of a display substrate of the OLED display panel, That is, the OLED display panel may identify a user's fingerprint by using an under-screen fingerprint identification solution. The fingerprint identification circuit will not occupy a non-display area of the display substrate in the OLED display panel, Therefore, the non-display area may be small, and thus, the OLED display panel has a relatively high screen-to-body ratio. The fingerprint identification circuit in the OLED display panel may be an optical fingerprint identification circuit or an ultrasonic fingerprint identification circuit.

However, due to poor light transmittance, an optical fingerprint identification circuit cannot be provided in a liquid crystal display panel in the LCD device to realize fingerprint identification. In addition, a backlight source needs to be provided in the liquid crystal display panel to provide backlight for a display substrate of the liquid crystal display panel. The backlight source will cause an air gap to the liquid crystal display panel, and the air gap will disable the ultrasonic fingerprint identification circuit from completing fingerprint identification. That is, it is impossible to provide an ultrasonic fingerprint identification circuit in the liquid crystal display panel to realize fingerprint identification. Therefore, the fingerprint identification circuit provided in the liquid crystal display panel is usually a capacitive fingerprint identification circuit. However, since the capacitive fingerprint identification circuit needs to be arranged in the non-display area of the display substrate, the display device has a relatively low screen-to-body ratio.

Figure 1:
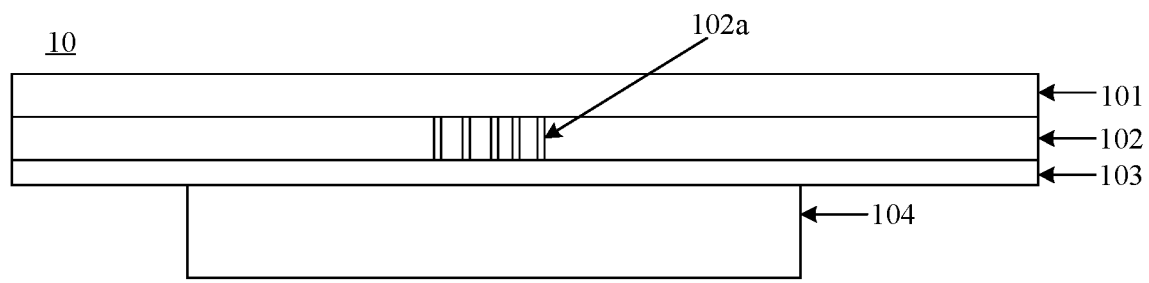
FIG. 1 is a schematic structural diagram of a display panel according to an embodiment of the present disclosure.

An embodiment of the present disclosure provides a display panel, and the problem that a display device in the related art has a relatively low screen-to-body ratio can be solved. As can be seen from FIG. 1, a display panel 10 may include a display substrate 101, a diffusion sheet 102, a transflective film 103, and a fingerprint identification circuit 104. The diffusion sheet 102, the transflective film 103, and the fingerprint identification circuit 104 are disposed on a side of the display substrate 101 and are sequentially stacked.

The diffusion sheet 102, the transflective film 103, and the fingerprint identification circuit 104 may be disposed on a non-display side of the display substrate 101, i.e., on a side of the display substrate 101 distal from a display side. The display substrate 101 may have a display area, and an orthographic projection of the fingerprint identification circuit 104 onto the display substrate 101 may be within the display area. The fingerprint identification circuit 104 may be configured to emit light of a target wavelength, and to perform fingerprint identification according to the received light of the target wavelength reflected by an obstacle (e.g., a user's finger).

The transflective film 103 may be configured to transmit the light of the target wavelength and reflect light other than the light of the target wavelength. That is, the transflective film 103 may transmit the light emitted by the fingerprint identification circuit 104 and the light reflected by the obstacle, and reflect light other than the light emitted by the fingerprint identification circuit 104 and the light reflected by the obstacle.

By providing the transflective film 103 in the display panel 10, on the one hand, the light emitted by the fingerprint identification circuit 104 may be transmitted to the display substrate, and the light reflected by the obstacle may be transmitted to the fingerprint identification circuit 104 to ensure normal completion of fingerprint identification. On the other hand, the light (e.g., light emitted by a backlight source in the display panel 10) other than the light emitted by the fingerprint identification circuit 104 and the light reflected by the obstacle may be reflected. The light reflected by the transflective film 103 may be irradiated to the display substrate 101, which improves the luminance of the display substrate 101. In addition. The transflective film 103 is provided to avoid interference of light of other wavelengths than the target wavelength with the fingerprint identification circuit 104, thereby ensuring the reliability of fingerprint identification.

In an embodiment of the present disclosure, since the diffusion sheet 102 scatters the light irradiated to the diffusion sheet 102, the light emitted by the fingerprint identification circuit 104 and the light of the target wavelength reflected by the obstacle may be scattered by the diffusion sheet 102 when irradiated to the diffusion sheet 102, and the fingerprint identification circuit 104 may not receive the light of the target wavelength reflected by the obstacle, resulting in a poor effect of fingerprint identification. Therefore, in order to reduce the scattering effect of the diffusion sheet 102 on the light irradiated to the diffusion sheet 102 to improve the effect of fingerprint identification, with reference to FIGS. 1 and 2, the diffusion sheet 102 may be provided with at least one through hole 102a, and an orthographic projection of the at least one through hole 102a onto the display substrate 101 may be within an orthographic projection of the fingerprint identification circuit 104 onto the display substrate 101.

By providing the at least one through hole 102a in the diffusion sheet 102, the light emitted by the fingerprint identification circuit 104 may be irradiated to the obstacle through the at least one through hole 102a, and the light of the target wavelength reflected by the obstacle may be irradiated to the fingerprint identification circuit 104 through the at least one through hole 102a. Therefore, the light emitted by the fingerprint identification circuit 104 and the light of the target wavelength reflected by the obstacle may be prevented from being scattered by the diffusion sheet 102, and the fact that the fingerprint identification circuit 104 may accurately receive the light of the target wavelength reflected by the obstacle is ensured, and the effect of fingerprint identification is good.

Optionally, the obstacle may be a user's finger, the light emitted by the fingerprint identification circuit 104 may be reflected by the user's finger, and the fingerprint identification circuit 104 performs fingerprint identification according to the light reflected by the user's finger.

Moreover, since the orthographic projection of the fingerprint identification circuit 104 onto the display substrate 101 is within the display area of the display substrate 101, the fingerprint identification circuit 104 can be prevented from occupying a non-display area of the display substrate 101. Therefore, the non-display area can be small, and thus, the display device has a relatively high screen-to-body ratio.

In summary, the display panel provided by the embodiments of the present disclosure may include the display substrate, the diffusion sheet, the transflective film, and the fingerprint identification circuit. The light of the target wavelength emitted by the fingerprint identification circuit may be reflected by the obstacle, and the light of the target wavelength reflected by the obstacle may be irradiated to the fingerprint identification circuit through the at least one through hole in the diffusion sheet. The fingerprint identification circuit performs fingerprint identification according to the received light of the target wavelength reflected by the obstacle. Since the orthographic projection of the fingerprint identification circuit onto the display substrate is within the display area of the display substrate, the fingerprint identification circuit can be prevented from occupying the non-display area of the display substrate. Therefore, the non-display area can be small, and thus, the display device has a relatively high screen-to-body ratio. Moreover, by providing the at least one through hole in the diffusion sheet, the light of the target wavelength reflected by the obstacle can be prevented from being scattered by the diffusion sheet, which ensures that the fingerprint identification circuit can accurately receive the light of the target wavelength reflected by the obstacle, and the effect of fingerprint identification is better.

Figure 2:
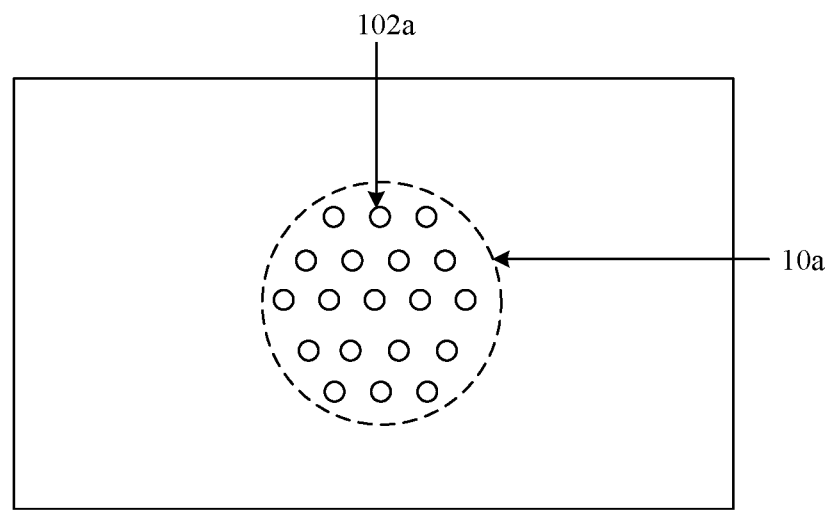
FIG. 2 is a schematic structural diagram of a diffusion sheet according to an embodiment of the present disclosure.

Optionally, referring to FIG. 2, the area where the orthographic projection of the fingerprint identification circuit 104 onto the display substrate 101 is within may be a fingerprint identification area 10a in the display area of the display substrate 101. The orthographic projection of the at least one through hole 102a in the diffusion sheet 102 on the display substrate 101 may be within the fingerprint identification area 10a. For example, the orthographic projections of all the through holes 102a in the diffusion sheet 102 onto the display substrate 101 are within the fingerprint identification area 10a.

When a user touches the fingerprint identification area 10a, with a finger, the fingerprint identification circuit 104 may emit the light of the target wavelength and receive the light of the target wavelength reflected by the user's finger, thereby realizing fingerprint identification.

In an embodiment of the present disclosure, the display panel 10 may include a memory with a user's fingerprint image pre-stored therein. After the fingerprint identification circuit 104 receives the light of the target wavelength reflected by the obstacle (the user's finger), a user's fingerprint image may be determined according to the light of the target wavelength reflected by the obstacle, and then, the determined user's fingerprint image is compared with the pre-stored fingerprint image to realize fingerprint identification and to verify the user's identity.

Optionally, the number of the through holes 102a provided in the diffusion sheet 102 may be ranged from 50 to 100. That is, there may be many through holes 102a in the diffusion sheet 102 to ensure that the light of the target wavelength reflected by the obstacle can be irradiated to the fingerprint identification circuit 104, which ensures the effect of fingerprint identification.

In addition, an aperture of each through hole 102a provided in the diffusion sheet 102 may be ranged from 50 μm to 100 μm, That is, the aperture of the through hole 102a provided in the diffusion sheet 102 is relatively small, which avoids a big luminance difference of the display substrate between an area where the through hole 102a is provided in the diffusion sheet 102 and an area where the through hole 102a is not provided in the diffusion sheet 102, thereby ensuring the display effect of the display substrate 101.

Figure 3:
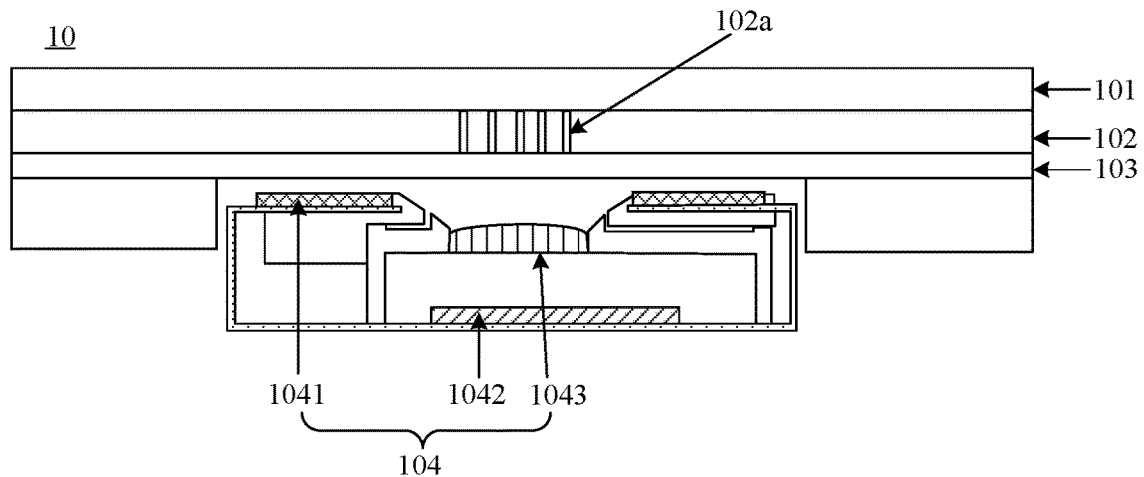
FIG. 3 is a schematic structural diagram of another display panel according to an embodiment of the present disclosure.

As can be seen from FIG. 3, the fingerprint identification circuit 104 may include a first light-emitting element 1041 and a fingerprint identification sensor 1042. The first light-emitting element 1041 may be configured to emit light of the target wavelength. The fingerprint identification sensor 1042 may be configured to perform fingerprint identification according to the received light reflected by the obstacle. In addition, since the light emitted by the first light-emitting element 1041 is the light of the target wavelength, the wavelength of the light emitted by the first light-emitting element 1041 after being reflected by the obstacle is also the target wavelength. Therefore, the light received by the fingerprint identification sensor 1042 is also of the target wavelength.

Optionally, the fingerprint identification circuit 104 may include one or more first light-emitting elements 1041, which will not be limited in embodiments of the present disclosure. For example, two first light-emitting elements 1041 are shown in FIG. 3.

In an embodiment of the present disclosure, the light of the target wavelength emitted by the first light-emitting element 1041 may sequentially pass through the transflective film 103, the diffusion sheet 102, and the display substrate 101 to be irradiated to the obstacle (the user's finger) on the side of the display substrate 101 distal from the diffusion sheet 102. The obstacle ma reflect the light of the target wavelength irradiated to the obstacle, and the light of the target wavelength reflected by the obstacle may sequentially pass through the display substrate 101, the through hole 102*a* in the diffusion sheet 102, and the transflective film 103 to be irradiated to the fingerprint identification circuit 104, and the fingerprint identification circuit 104 further performs fingerprint identification according to the received light reflected by the obstacle.

Optionally, the first light-emitting element 1041 may be an infrared light-emitting diode (LED). A wavelength of target light emitted by the infrared LED 1041 may be greater than or equal to 850 nm. That is, the light emitted by the infrared LED 1041 is infrared light.

In an embodiment of the present disclosure, the display substrate 101 may be a liquid crystal display substrate. The liquid crystal display substrate 101 may include a first polarizing layer, an array substrate, a liquid crystal layer, a color film substrate, and a second polarizing layer that are sequentially stacked. That is, the first polarizing layer may be disposed on a side of the array substrate distal from the color film substrate, and the second polarizing layer may be disposed on a side of the color film substrate distal from the array substrate. The first polarizing layer and the second polarizing layer may be configured to polarize light.

When passing through the display substrate 101, the light emitted by the first light-emitting element 1041 may sequentially pass through the first polarizing layer, the array substrate, the liquid crystal layer, the color film substrate, and the second polarizing layer of the display substrate 101. Since the first light-emitting element 1041 is an infrared LED, the light emitted by the infrared LED 1041 is infrared. However, neither the first polarizing layer nor the second polarizing layer polarizes the infrared light, such that the light emitted by the first light-emitting element 1041 is not interfered by the first polarizing layer or the second polarizing layer of the display substrate 101. That is, the light emitted by the first light-emitting element 1041 does not cause loss substantially when passing through the display substrate 101, and the fingerprint identification sensor 1042 can receive enough infrared light reflected by the obstacle, thereby ensuring normal completion of fingerprint identification.

As can be seen from FIG. 3, the fingerprint identification circuit 104 may further include a lens 1043. The lens 1043 may be disposed on a side of the fingerprint identification sensor 1042 proximal to the display substrate 101. The lens 1043 may be configured to converge the light of the target wavelength reflected by the obstacle to the fingerprint identification sensor 1042. The fingerprint identification sensor 1042 may be configured to perform fingerprint identification according to the converged light.

In addition, since the light of the target wavelength reflected by the obstacle may be scattered and lost after passing through the display substrate 101, the diffusion sheet 102, and the transflective film 103 in sequence, the light of the target wavelength reflected by the obstacle may be converged to the fingerprint identification sensor 1042 by the lens 1043, which improves the accuracy of fingerprint identification.

Figure 4:
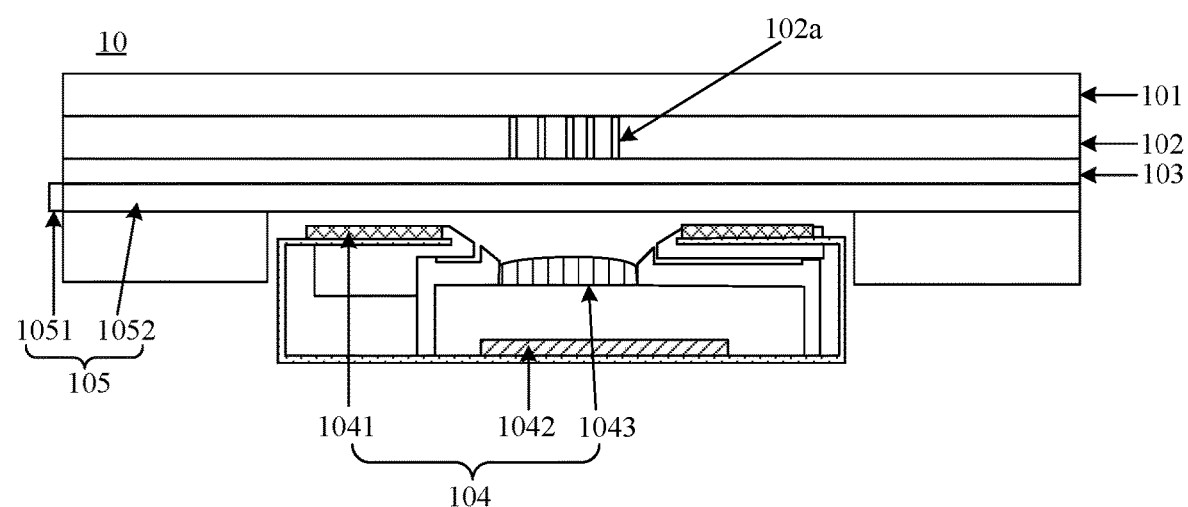
FIG. 4 is a schematic structural diagram of yet another display panel according to an embodiment of the present disclosure.

FIG. 4 is a schematic structural diagram of another display panel according to an embodiment of the present disclosure. As can be seen from FIG. 4, the display panel 10 may further include a backlight source 105. The backlight source 105 may be disposed between the diffusion sheet 102 and the fingerprint identification circuit 104 to provide backlight for the display substrate 101.

The light emitted by the backlight source 105 may be irradiated to the display substrate 101 after being scattered by the diffusion sheet 102, so as to provide backlight for the display substrate 101, In addition, the light emitted by the backlight source 105 may be visible, that is, the wavelength of the light emitted by the backlight source 105 may be ranged from 380 nm to 780 nm.

In an embodiment of the present disclosure, the reflectivity of the transflective film 103 for light of a wavelength ranging from 380 ran to 780 nm may be approximate to 100%, and the transflective film 103 has excellent transmittance for light of a wavelength greater than or equal to 850 nm (e.g., for infrared light, the transmittance may reach 90%). That is, the transflective film 103 may effectively reflect the light emitted by the backlight source 105. The light emitted by the backlight source 105 is irradiated to the display substrate 101 after being reflected by the transflective film 103, such that loss of the light emitted by the backlight source 105 may be reduced, thereby ensuring the display effect of the display substrate 101.

Since the transflective film 103 may transmit the light of the target wavelength (i.e., light of a wavelength greater than or equal to 850 nm), the transflective film 103 does not need to be provided with through holes, and the light emitted by the backlight source 105 is prevented from leaking from the through hole in the transflective film 103. The light emitted by the backlight source 105 may be all reflected by the transflective film 103 to one side of the display substrate 101, which further ensures the display effect of the display substrate 101.

As can be seen from FIG. 4, the backlight source 105 may include a second light-emitting element 1051 and a light guide plate 1052. The second light-emitting element 1051 may emit light, and the light emitted by the second light-emitting element 1051 may be visible. The light guide plate 1052 may be provided with a plurality of dots, and the plurality of dots on the light guide plate 1052 may homogenize the light emitted by the second light-emitting element 1051.

The second light-emitting element 1051 may be disposed at one end of the light guide plate 1052. The light emitted by the second light-emitting element 1051 is homogenized by the light guide plate 1052, reflected by the transflective film 103, and then irradiated to the diffusion sheet 102. After being scattered by the diffusion 102, the light is irradiated to the display substrate 101. When homogenizing the light emitted by the second light-emitting element 1051, the light guide plate 1052 may convert the light emitted by the second light-emitting element 1051 into a surface light source, and the surface light source may provide uniform backlight for the display substrate 101, thereby ensuring uniformity of luminance of the display substrate 101.

The light emitted by the second light-emitting element 1051 may be directly emitted through the through hole 102a in the diffusion sheet 102 where the through hole 012 is formed, and then irradiated to the display substrate 101. In contrast, the light emitted by the second light-emitting element 1051 may be diffused by the diffusion sheet 102 in an area without the through hole 102a and then irradiated to the display substrate 101. Therefore, the luminance of the area of the display substrate corresponding to the area of the diffusion sheet 102 provided with the through hole 102a is high, while the luminance of the other areas is low, and the uniformity of luminance of the display substrate 101 is poor.

Therefore, in an embodiment of the present disclosure, in order to improve the uniformity of luminance of the display substrate 101, the number of the dots in a target area of the light guide plate 1052 may be smaller than the number of the dots on the light guide plate 1052 excluding the target area. An orthographic projection of the target area onto the display substrate 101 may be overlapped with an orthographic projection of the through hole 102a in the diffusion sheet 102 onto the display substrate 101. For example, the orthographic projection of the target area onto the display substrate 101 and an orthographic projection of the fingerprint identification circuit 104 onto the display substrate 101 may coincide. For example, the orthographic projection of the target area onto the display substrate 101 and the fingerprint identification area 10a coincide.

Since the number of the dots in the target area of the light guide plate 1052 is less and the number of the dots in the area other than the target area is more, the homogenizing effect of the light source in the target area of the light guide plate 1052 is poor, and the homogenizing effect of the light source in the area of the light guide plate 1052 other than the target area is strong. Therefore, the luminance of the area corresponding to the target area of the light guide plate 1052 of the display substrate 101 may be reduced, such that the luminance of the area corresponding to the target area of the display substrate 101 is consistent with the luminance of other areas of the display substrate 101. Thus, the uniformity of luminance of the display substrate 101 is good.

In an embodiment of the present disclosure, the number of the dots in the target area of the light guide plate 1052 may be determined by experiments. For example, the number of the dots in the target area of the light guide plate 1052 may be acquired by testing the luminance of the display substrate 101 using a software algorithm.

Figure 5:
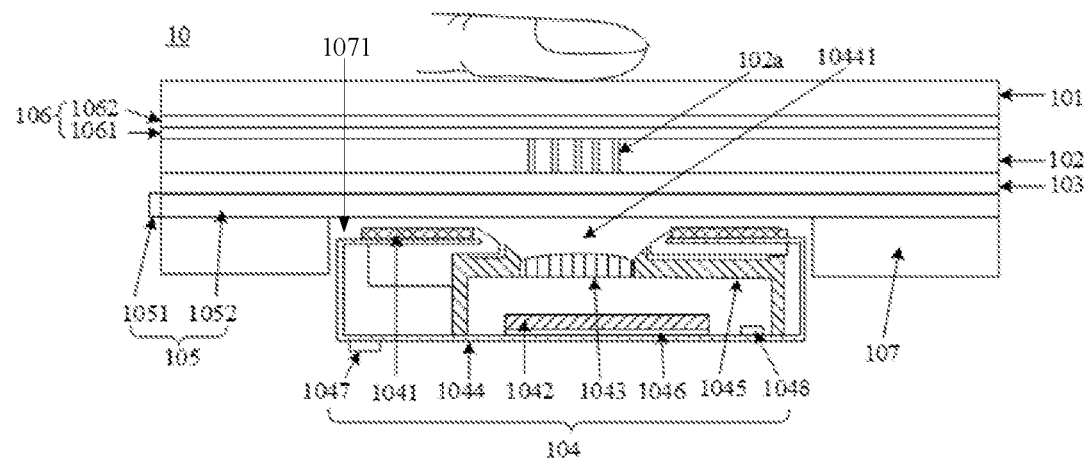
FIG. 5 is a schematic structural diagram of still another display panel according to an embodiment of the present disclosure.

FIG. 5 is a schematic structural diagram of still another display panel according to an embodiment of the present disclosure. As can be seen from FIG. 5, the display panel 10 may further include a prism assembly 106. The prism assembly 106 may be disposed on a side of the diffusion sheet 102 distal from the backlight source 105. The prism assembly 106 may be configured to reduce an angle of light incident onto the prism assembly 106, that is, the light with a larger angle may be moved closer toward a direction perpendicular to the plane where the display substrate 101 is disposed, such that the luminance of the display substrate 101 is improved.

It should be noted that the number of prisms in the prism assembly 106 may be one or more, which will not be limited in the embodiments of the present disclosure.

Exemplarily, the prism assembly 106 in the display panel 10 shown in FIG. 5 includes a first prism 1061 and a second prism 1062. The first prism 1061 may be disposed on a side of the diffusion sheet 102 distal from the fingerprint identification circuit 104, and the second prism 1062 may be disposed on a side of the first prism 1061 distal from the diffusion sheet 102. Thus, light emitted by the infrared LED in the fingerprint identification circuit 104 may be irradiated to the display substrate 101 after being converged twice by the first prism 1061 and the second prism 1062. In addition, the light converged twice has a relatively small angle, such that the luminance of the display substrate 101 is relatively high.

It can also be seen from FIG. 5 that the fingerprint identification circuit 104 may further include a supporting plate 1044 and a fixing bracket 1045 fixedly connected to the supporting plate 1044. The fingerprint identification sensor 1042 may be fixedly arranged on the supporting plate 1044, and a lens 1043 may be fixedly arranged on the fixing bracket 1045, By securing the fingerprint identification sensor 1042 and the lens 1043 with the supporting plate 1044 and the fixing bracket 1045, the lens 1043 and the fingerprint identification sensor 1042 may be prevented from shaking, light of the target wavelength reflected by the obstacle may be accurately converged to the fingerprint identification sensor 1042 disposed on the side of the lens 1043 distal from the display substrate 101, and in turn the accuracy of fingerprint identification by the fingerprint identification sensor 1042 is ensured.

Optionally, a material of the supporting plate 1044 may include a soft material. Referring to FIG. 5, the supporting plate 1044 may be bent into an annular supporting plate 1044, and a side of the annular supporting plate 1044 proximal to the display substrate 101 is provided with a first opening. The fingerprint identification sensor 1042 may be disposed in a region enclosed by the annular supporting plate 1044 and fixed on the side of the supporting plate 1044 distal from the first opening. Moreover, an orthographic projection of the first opening onto the display substrate 101 may be overlapped with an orthographic projection of the lens 1043 onto the display substrate 101. An orthographic projection of the fingerprint identification sensor 1042 onto the display substrate 101 may be overlapped with the orthographic projection of the lens 1043 onto the display substrate 101.

Thus, the light of the target wavelength reflected by the obstacle may pass through the first opening, and may be irradiated to the fingerprint identification sensor 1042 after being converged by the lens 1043, such that the fingerprint identification sensor 1042 may receive the light of the target wavelength reflected by the obstacle for fingerprint identification.

Referring to FIG. 5, the first light-emitting element 1041 may be disposed outside the region enclosed by the annular supporting plate 1044 and fixed on the side of the supporting plate 1044 provided with the first opening. That is, light emitted by the first light-emitting element 1041 may directly pass through the transflective film 103, the diffusion sheet 102, and the prism assembly 106 and then be irradiated to the display substrate 101. This ensures that the light irradiated to the obstacle is strong, and further ensures that the fingerprint identification circuit 104 can accurately receive the light of the target wavelength reflected by the obstacle. Thus, the reliability of fingerprint identification is better.

Referring to FIG. 5, the fingerprint identification sensor 1042 may be fixed on the supporting plate 1044 by a die attach film (DAF) 1046. The fingerprint identification sensor 1042 is fixed on the supporting plate 1044 by the DAF 1046, such that the fingerprint identification sensor 1042 can be further prevented from shaking, and the accuracy of fingerprint identification is high.

In an embodiment of the present disclosure, the fingerprint identification circuit 104 may further include other devices. Exemplarily, as can be seen from FIG. 5, the fingerprint identification circuit 104 may further include a board-to-board connector (BTB) 1047 and a capacitor (CAP) 1048. The fingerprint identification circuit 104 provided by the embodiment of the present disclosure can realize single-point fingerprint identification, and the fingerprint identification sensor 1042 in the fingerprint identification circuit 104 occupies a small space. In addition, since the cost of the fingerprint identification circuit 104 is low, the manufacturing cost of the display device is also low.

It can also be seen from FIG. 5 that the display panel 10 may further include a fixed frame 107. The fixed frame 107 may be provided with a second opening in which the fingerprint identification circuit 104 may be fixed, such that the fingerprint identification circuit 104 does not shake relative to the display substrate 101, the quality of the display panel 10 is better.

Exemplarily, the fixed frame 107 may be a middle frame of the display device.

In summary, the display panel provided by the embodiments of the present disclosure may include the display substrate, the diffusion sheet, the transflective film, and the fingerprint identification circuit. The light of the target wavelength emitted by the fingerprint identification circuit may be reflected by the obstacle, and the light of the target wavelength reflected by the obstacle may be irradiated to the fingerprint identification circuit through the at least one through hole in the diffusion sheet. The fingerprint identification circuit performs fingerprint identification according to the received light of the target wavelength reflected by the obstacle. Since the orthographic projection of the fingerprint identification circuit onto the display substrate is within the display area of the display substrate, the fingerprint identification circuit can be prevented from occupying anon-display area of the display substrate. Therefore, the non-display area can be small, and thus, the display device has a relatively high screen-to-body ratio. Moreover, by providing the at least one through hole in the diffusion sheet, the light of the target wavelength reflected by the obstacle can be prevented from being scattered by the diffusion sheet, which ensures that the fingerprint identification circuit can accurately receive the light of the target wavelength reflected by the obstacle, and the effect of fingerprint identification is better.

Figure 6:
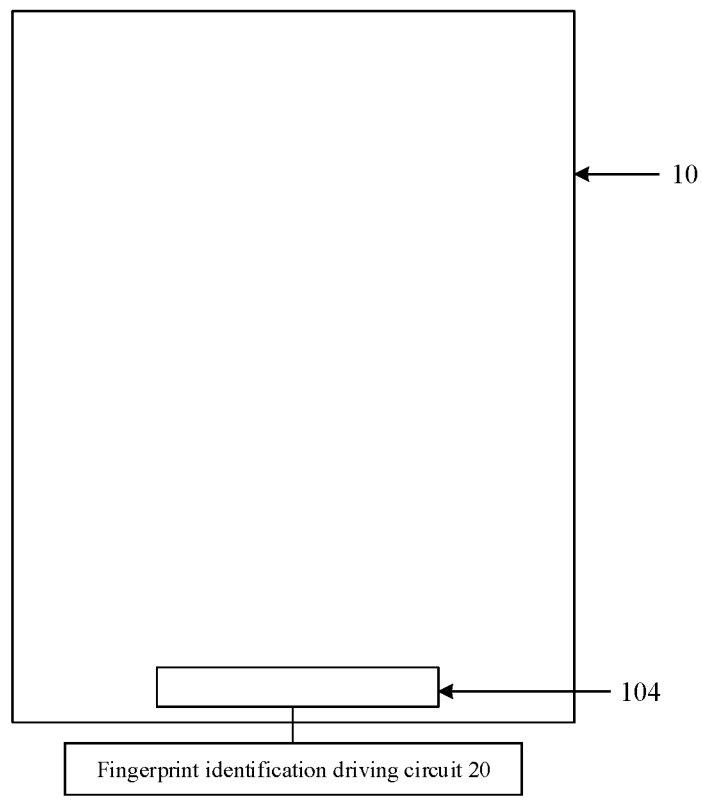
FIG. 6 is a schematic structural diagram of a display device according to an embodiment of the present disclosure.

FIG. 6 is a schematic structural diagram of a display device according to an embodiment of the present disclosure. Referring to FIG. 6, the display device may include a fingerprint identification driving circuit 20 and the display panel 10 provided by the foregoing embodiment. The fingerprint identification driving circuit 20 may be connected to a fingerprint identification circuit 104 and configured to provide a driving signal for the fingerprint identification circuit 104 in the display panel 10.

Figure 7:
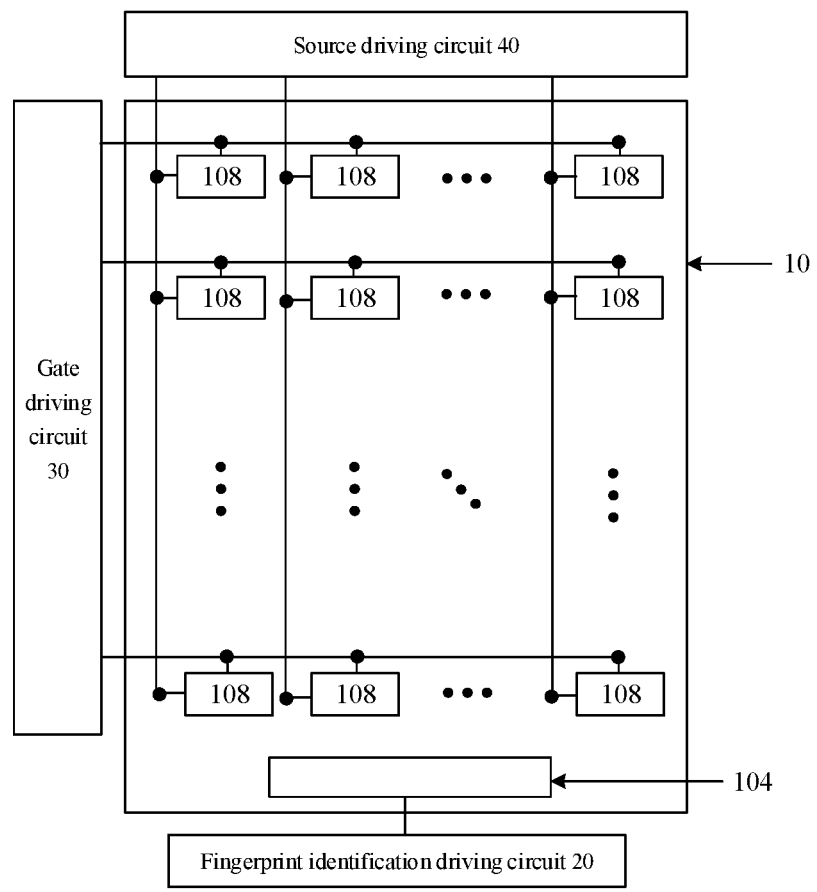
FIG. 7 is a schematic structural diagram of another display device according to an embodiment of the present disclosure.

Optionally, referring to FIG. 7, the display device may further include a gate driving circuit 30 and a source driving circuit 40. The gate driving circuit 30 may be connected to each row of pixels 108 in the display panel 10 by a gate line and configured to provide a gate driving signal for each row of pixels 108. The source driving circuit 40 may be connected to each column of pixels 108 in the display panel 10 by a data line and configured to provide a data signal for each column of pixels 108.

Optionally, the display device may be any product or component with both a display function and a fingerprint identification function, such as a liquid crystal display device, electronic paper, a mobile phone, a tablet computer, a television, a display, a notebook computer, a digital photo frame, or a navigator.

Described above are merely optional embodiments of the present disclosure, and are not intended to limit the present disclosure. Within the spirit and principles of the present disclosure, any modifications, equivalent substitutions, improvements, and the like are within the protection scope of the present disclosure.

What is claimed is:

1. A display panel, comprising a display substrate, a diffusion sheet, a transflective film, a fingerprint identification circuit, and a fixed frame, wherein the diffusion sheet, the transflective film, and the fingerprint identification circuit are disposed on a side of the display substrate and are sequentially stacked, and the fixed frame is disposed on one side of the transflective film distal from the display substrate;

wherein the display substrate has a display area, an orthographic projection of the fingerprint identification circuit onto the display substrate is within the display area, and the fingerprint identification circuit is configured to emit light of a target wavelength, and to perform fingerprint identification according to received light of the target wavelength reflected by an obstacle;

the transflective film is configured to transmit the light of the target wavelength and reflect light other than the light of the target wavelength; and the diffusion sheet is provided with a plurality of through holes, and an orthographic projection of the plurality of through holes onto the display substrate is within the orthographic projection of the fingerprint identification circuit onto the display substrate, an aperture of each of the plurality of through holes is ranged from 50 μm to 100 μm, and the number of the plurality of through holes provided in the diffusion sheet is ranged from 50 to 100;

wherein the fingerprint identification circuit comprises a first light-emitting element, a fingerprint identification sensor, and a supporting plate, wherein the first light-emitting element is configured to emit the light of the target wavelength; the fingerprint identification sensor is configured to perform fingerprint identification according to the received light reflected by the obstacle; the fingerprint identification sensor and the first light-emitting element are fixedly arranged on the supporting plate; and the fixed frame is provided with a second opening, orthographic projections of the first light-emitting element and the supporting plate on the display substrate falling within an orthographic projection of the second opening on the display substrate.

2. The display panel according to claim 1, wherein the first light-emitting element is an infrared light-emitting diode; and the target wavelength is greater than or equal to 850 nm.

3. The display panel according to claim 1, wherein the fingerprint identification circuit further comprises a lens, wherein the lens is configured to converge the light of the target wavelength reflected by the obstacle to the fingerprint identification sensor; and the fingerprint identification sensor is configured to perform fingerprint identification according to the converged light.

4. The display panel according to claim 3, wherein the fingerprint identification circuit further comprises a fixing bracket fixedly connected to the supporting plate; and the lens is fixedly arranged on the fixing bracket.

5. The display panel according to claim 4, wherein a material of the supporting plate comprises a soft material, the supporting plate is annular, and a side of the supporting plate proximal to the display substrate is provided with a first opening; and the fingerprint identification sensor is disposed in a region enclosed by the supporting plate and fixed on a side of the supporting plate distal from the first opening.

6. The display panel according to claim 5, wherein the first light-emitting element is disposed outside the region enclosed by the supporting plate and fixed on the side of the supporting plate provided with the first opening.

7. The display panel according to claim 5, wherein an orthographic projection of the first opening onto the display substrate is overlapped with an orthographic projection of the lens onto the display substrate, and an orthographic projection of the fingerprint recognition sensor onto the display substrate is overlapped with the orthographic projection of the lens onto the display substrate.

8. The display panel according to claim 1, wherein the display substrate is a liquid crystal display substrate.

9. The display panel according to claim 8, wherein the display substrate comprises a first polarizing layer, an array substrate, a liquid crystal layer, a color film substrate, and a second polarizing layer that are sequentially stacked.

10. The display panel according to claim 1, further comprising a backlight source, wherein the backlight source is disposed between the diffusion sheet and the fingerprint identification circuit and configured to provide backlight for the display substrate.

11. The display panel according to claim 10, wherein a wavelength of light emitted by the backlight source is ranged from 380 nm to 780 nm.

12. The display panel according to claim 10, wherein the backlight source comprises a second light-emitting element and a light guide plate.

13. The display panel according to claim 10, further comprising a prism assembly, wherein the prism assembly is disposed on a side of the diffusion sheet distal from the backlight source.

14. The display panel according to claim 13, wherein the prism assembly comprises a first prism and a second prism, wherein the first prism is disposed on a side of the diffusion sheet distal from the fingerprint identification circuit, and the second prism is disposed on a side of the first prism distal from the diffusion sheet.

15. A display device, comprising a fingerprint identification driving circuit and a display panel, wherein the display panel comprises a display substrate, a diffusion sheet, a transflective film, a fingerprint identification circuit, and a fixed frame, wherein the diffusion sheet, the transflective film, and the fingerprint identification circuit are disposed on a side of the display substrate and are sequentially stacked and the fixed frame is disposed on one side of the transflective film distal from the display substrate;

wherein the display substrate has a display area, an orthographic projection of the fingerprint identification circuit onto the display substrate is within the display area, and the fingerprint identification circuit is configured to emit light of a target wavelength, and to perform fingerprint identification according to received light of the target wavelength reflected by an obstacle;

the transflective film is configured to transmit the light of the target wavelength and reflect light other than the light of the target wavelength; and the diffusion sheet is provided with a plurality of through holes, and an orthographic projection of the plurality of through holes onto the display substrate is within the orthographic projection of the fingerprint identification circuit onto the display substrate, an aperture of each of the plurality of through holes is ranged from 50 μm to 100 μm, and the number of the plurality of through holes provided in the diffusion sheet is ranged from 50 to 100; wherein the fingerprint identification circuit comprises a first light-emitting element, a fingerprint identification sensor, and a supporting plate, wherein the first light-emitting element is configured to emit the light of the target wavelength; the fingerprint identification sensor is configured to perform fingerprint identification according to the received light reflected by the obstacle; the fingerprint identification sensor and the first light-emitting element are fixedly arranged on the supporting plate; and the fixed frame is provided with a second opening, orthographic projections of the first light-emitting element and the supporting plate on the display substrate falling within an orthographic projection of the second opening on the display substrate; and the fingerprint identification driving circuit is connected to a fingerprint identification circuit in the display panel and configured to provide a driving signal for the fingerprint identification circuit.

16. The display device according to claim 15, further comprising a gate driving circuit and a source driving circuit, wherein the gate driving circuit is connected to each row of pixels in the display panel and configured to provide a gate driving signal for each row of pixels; and the source driving circuit is connected to each column of pixels in the display panel and configured to provide a data signal for each column of pixels.

* * * * *